(12) United States Patent
Haide (10) Patent No.: US 11,843,162 B2
(45) Date of Patent: Dec. 12, 2023

(54) MIMO RADAR SYSTEM FOR AN AERIAL VEHICLE

(71) Applicant: Hensoldt Sensors GmbH, Taufkirchen (DE)

(72) Inventor: Manuel Haide, Ulm (DE)

(73) Assignee: Hensoldt Sensors GmbH, Taufkirchen (DE)

( * ) Notice: Subject to any disclaimer, the term of this patent is extended or adjusted under 35 U.S.C. 154(b) by 296 days.

(21) Appl. No.: 17/449,553

(22) Filed: Sep. 30, 2021

(65) Prior Publication Data

US 2022/0109231 A1 Apr. 7, 2022

(30) Foreign Application Priority Data

Oct. 3, 2020 (EP) ..................................... 20199968

(51) Int. Cl.
*H01Q 1/28* (2006.01)
*G01S 13/933* (2020.01)
(Continued)

(52) U.S. Cl.
CPC .............. *H01Q 1/28* (2013.01); *G01S 13/878* (2013.01); *G01S 13/933* (2020.01); *H04B 7/0413* (2013.01)

(58) Field of Classification Search
CPC ....... H01Q 1/28; G01S 13/933; G01S 13/878; H04B 7/0413
(Continued)

(56) References Cited

U.S. PATENT DOCUMENTS

2012/0001791 A1 1/2012 Wintermantel
2016/0131752 A1 5/2016 Jansen et al.
(Continued)

FOREIGN PATENT DOCUMENTS

EP 3 339 894 A1 6/2018
WO WO 2018/071077 A3 4/2018

OTHER PUBLICATIONS

Extended European Search Report issued in European Application No. 20199968.7 dated Mar. 26, 2021 (10 pages).

*Primary Examiner* — Peguy Jean Pierre
(74) *Attorney, Agent, or Firm* — Crowell & Moring LLP (57) ABSTRACT

A multiple-input multiple-output, MIMO, radar system for detecting an object in a vicinity of an aerial vehicle, includes a first transmitter patch, a second transmitter patch, and a third transmitter patch. Each transmitter patch has, respectively, a first, second, and third plurality of transmitting antenna elements configured to transmit, respectively, a first, second and third plurality of transmission signals. The MIMO radar system further includes a plurality of receiving antenna elements, wherein each receiving antenna element is configured to receive the transmitted transmission signals after their reflection from the object. The MIMO radar system further includes a signal forming module, configured to generate the transmission signals and to provide the transmission signals to their respective transmitting antenna elements. The MIMO radar system further includes a digital processing module, configured to detect, based on the received transmission signals, characteristics of the object. A first direction between the first transmitter patch and the second transmitter patch is different from a second direction between the second transmitter patch and the third transmitter patch. Also, each transmitter patch includes multiple transmitting antenna elements in the first as well as in the second direction. With this, a virtual array of receiving (Continued)

antenna elements which extends the plurality of receiving antenna elements in the first and in the second direction in a gap-free and homogeneous way is achieved.

14 Claims, 5 Drawing Sheets

(51) Int. Cl.
*G01S 13/87* (2006.01)
*H04B 7/0413* (2017.01)

(58) Field of Classification Search
USPC .................................................... 343/700 R
See application file for complete search history.

(56) References Cited

U.S. PATENT DOCUMENTS

| | | | |
|---|---|---|---|
| 2018/0172815 A1 | 6/2018 | Mckitterick | |
| 2019/0207322 A1 | 7/2019 | Ding | |
| 2019/0310358 A1* | 10/2019 | Lee | G01S 13/42 |
| 2019/0324136 A1 | 10/2019 | Amadjikpe | |

* cited by examiner

MIMO RADAR SYSTEM FOR AN AERIAL VEHICLE

FIELD

The present invention relates to a multiple input multiple output, MIMO, radar system for detecting an object in a vicinity of an aerial vehicle, and to a method for running such a MIMO radar system, and in particular to an airborne radar system.

BACKGROUND

Radar systems capable of capturing characteristics of objects in their vicinity are employed on vehicles and various types of aircraft for many different range scales. These radar systems may comprise a plurality of transmitter antennas which, coordinated by appropriate electronic equipment, are configured to transmit signals from each of the antennas with an individual phase shift and relative amplitude, thereby collectively forming a radar beam of a particular shape and direction, without the need of moving the transmitter antennas. An advanced type of these phased-array radar systems is referred to as multiple-input multiple-output, MIMO, radar system. A MIMO radar system combines a plurality of transmitting antenna elements and a plurality of receiving antenna elements. The transmitting antenna elements are configured to transmit mutually orthogonal signals, i.e. signals with waveform that can be separated and analyzed as individual information by a processing mean on the receiver part. These waveforms can therefore be extracted by each of the receiving antenna elements, and assigned to their respective transmitting antenna element. When appropriately arranged, a first number m of transmitting antenna elements and a second number n of receiving antenna elements can act as n m individual transmitter-receiver pairs, wherein the receivers are located not only at the physical positions of the actual receiving antenna elements, but are related to virtual positions, forming a virtual antenna array of larger aperture.

For MIMO radar systems, a variety of orthogonal signals is known in the state of the art. Signals can e.g. be orthogonal owing to different frequencies (e.g. orthogonal frequency division multiplexing OFDM, frequency division multiplexing FDM, discrete frequency coded waveform DFCW, phase modulated continuous wave PMCW) or different time slots for transmitting the signals (e.g. a time division multiplexing, TDM, method). Reception signals can also be differentiated and analyzed by means of phase differences, both between different virtual channels as well as between an emitted and a corresponding received signal. Signals may be formed with a frequency that varies in time. In the state of the art, such chirped signals usually show a linearly rising or falling (carrier) frequency, and are frequently employed in extracting a range of a detected object, e.g. by comparing the instantaneous frequency of a transmitted and a received chirp, and a velocity of the detected object, e.g. by means of a Doppler (i.e., frequency) shift of the reflected and received signal.

In the state of the art there are frequency-modulated continuous wave, FMCW, MIMO radar systems which radiate trains of signals, often imprinting a code in a variation of their electromagnetic frequency. Compared to pulsed systems, FMCW radars spread their total transmission energy over a large time period, which decreases transmitter power and yields low safety distances and high integration times. For these reasons, the cost efficient FMCW radar systems have become widely accepted for close-range applications within distances of up to 200 meters, in particular in the automotive industry. For these systems, the application of MIMO technology in antenna construction has led to a vast increase of the physical apertures by virtual apertures, augmenting in particular the angular resolution of digital processing procedures adapted for directional signal reception (digital beamforming, DBF).

In contrast, FMCW radar systems in aerial vehicles, in particular when used in an urban environment, will need to cover ranges of 2 km and more, while still required to be lightweight and sufficiently small. Since transmission power for radars depends on the intended range raised to the fourth power, the transmission power for such a radar system would have to exceed the corresponding transmission power of a system designed for a range of 200 meters by 40 dB. Such an increase of transmission power will lead to considerable crosstalk problems between transmitter and receiver antennas, along with high ground clutter in the received signal. Both effects will lead to an overcharge of the receiver.

The following exemplary references may help to provide an overview of some recent development in these directions.

The method of WO 2018/071077 A3 is adapted to determine if a velocity of an object detected by the radar system exceeds a theoretical maximum velocity as detectable by that radar system.

The application US 2012/0001791 A1 discloses a MIMO radar system adapted to detect a velocity of an object while suppressing interference radiation, in particular by means of varying phase positions of the emitted or received signals.

The application US 2016/0131752 A1 shows a MIMO radar system adapted to send a train of chirped pulses from a plurality of transmitter antenna elements, and infer a position (distance and angle) and velocity of an object from reflections received in multiple receiver antenna elements by means of a beat frequency and a relative phase derived from emitted and received signals. The proposed radar system further improves results by applying, in particular, alternating transmission times for different transmitter antenna elements (i.e. a form of time-division multiplexing).

The application US 2018/0172815 A1 shows a radar system for an aerial vehicle with an improved Doppler velocity determination, operating on a similar principle as the one described just before.

The application EP 3 339 894 A1 discloses a MIMO radar system with multiple transmitter and receiver elements, capable of detecting range, azimuth angle, elevation angle, and speed of an object. These four characteristics are detected by means of four respective Fourier transformation operations.

There exists a demand for a radar system suitable for an extended close-range application (e.g. up to 2 km), which is adapted for aerial vehicles deployed at low altitudes (of e.g. up to 300 meters), and requires a small transmission power to suppress crosstalk between transmitter and receiver antennas, ground clutter in the received signal, and an overcharge of the receiver.

SUMMARY OF THE INVENTION

At least some of the above-mentioned problems are solved by a multiple-input multiple-output, MIMO, radar system for an aerial vehicle, a method for running a MIMO radar system, and a computer program product, according to the independent claims. The dependent claims refer to further advantageous realizations for the subject matters of the independent claims.

The present invention relates to a MIMO radar system for detecting an object in a vicinity of an aerial vehicle. The MIMO radar system comprises a first transmitter patch, a second transmitter patch, and a third transmitter patch. Each of these three transmitter patches comprises, respectively, a first, second, and third plurality of transmitting antenna elements. Each of these pluralities of transmitting antenna elements is configured to transmit (or emit), respectively, a first, a second and a third plurality of transmission signals. The MIMO radar system further comprises a plurality of receiving antenna elements. Each receiving antenna element is configured to receive radar frequency electromagnetic waves, and in particular the transmitted (or emitted) transmission signals after they have been reflected from the object. The MIMO radar system comprises a signal forming module, configured to generate the transmission signals and to provide the transmission signals to their respective transmitting elements. The MIMO radar system further comprises a digital processing module, configured to detect, based on the received transmission signals, characteristics of the object.

The transmitter patches are arranged as follows: the first transmitter patch and the second transmitter patch are used for a first, e.g. the azimuth, direction, and the second transmitter patch and the third transmitter patch are used for a second, e.g. the elevation, direction. Based on their linear independent transmission signals the azimuth direction and the elevation direction are also linearly independent. Also, in the arrangement of the first, second and third transmitting antenna elements within the first, second and third transmitter patch, each transmitter patch includes multiple transmitting antenna elements in the first as well as in the second direction. This arrangement of the transmitting antenna elements and the transmitter patches achieves a virtual array of receiving antenna elements which extends the plurality of receiving antenna elements in the first and in the second direction in a gap-free and homogeneous way. This means that an arrangement, e.g. a grid or a lattice, of receiving antenna elements is extended seamlessly into a virtual array.

The term "object" should be construed broadly and includes also the ground or any other (aerial) vehicle, but also any kind of obstacles. The aerial vehicle may in particular be a lightweight aircraft, an unmanned aerial vehicle, or a flying platform. The MIMO radar system is of beneficial use for aerial vehicles adapted for flying at low altitudes (as e.g. up to airspace G or F, or up to e.g. 2500, 3000, or 3500 feet) and high speeds (as e.g. up to 160 or 200 km/h), possibly in urban areas or areas with high flight traffic of a similar kind.

The transmitting antenna elements may be embodied as patch antennas. They may be of a shape adapted to form radiation in particular polarizations, such as rectangular (for linear polarizations) or circular (for circular polarizations). Areas of the transmitting antenna elements may e.g. range between 1 and 100 mm$^2$. Each transmitting antenna may be connected to an individual feed from the signal forming module. The first, second, and third transmitting antenna elements, forming the first, second and third transmitter patch respectively, are arranged in a regular pattern, extending in the first and the second direction. In particular, in embodiments of the MIMO radar system, the first, second, and third transmitting antenna elements are arranged in uniformly spaced planar arrays in order to form the first, second, and third transmitter patch, respectively.

As the transmitting antenna elements, the receiving antenna elements may also be patch antennas. In embodiments, the receiving antenna elements may be of the same or nearly the same dimensions and shape as the transmitting antenna elements. Each receiving antenna may be connected to the digital processing module by an individual connection, and with an individual low-noise amplifier. The receiving antenna elements may be arranged in one or more receiver patches. The one or more receiver patches may each comprise more receiving antenna elements than either of the transmitter patches comprises transmitting antenna elements. In embodiments of the MIMO radar system, receiving antenna elements are arranged in a uniformly spaced planar array.

Distances between the transmitting antenna elements within the same transmitter patch are much smaller than distances between transmitting antenna elements of different patches and distances between transmitting and receiving antenna elements. In units defined by a diameter of a transmitting antenna element (which in general will be adapted to a wavelength of the transmission signals), distances between neighboring transmitting antenna elements within a transmitter patch may be on the order of one half to one, while distances between borders of two transmitter patches may be e.g. 2, or 5, or larger. It is known in the state of the art how positions of transmitting and receiving antenna elements determine relative positions of virtual receiving elements. By grouping the transmitting antenna elements into separated patches, distances between the transmitter patches suppress crosstalk between different transmitting antenna elements, different receiving antenna elements, and/or between transmitting and receiving antenna elements.

The signal forming module prepares the transmission signals and provides them to the transmitting antenna elements. The radar system is advantageously configured as a continuous wave radar, and in particular as a frequency-modulated continuous wave, FMCW, system. The signal forming module is configured to adapt phases and relative amplitudes of the transmission signals such that the transmitted transmission signals form a radar beam in a particular direction. Mechanisms for obtaining such an adaptation of phases and relative amplitudes are known in the state of the art. Here, each transmitter patch acts, by means of its transmitting antenna elements, as an individual phased array. Due to the extension in both the first and the second direction, the transmission signals form a radar beam which is directable, by suitably adjusting the phase adaptation, in any direction over the planar arrangement of the respective transmitting antenna elements. The signal forming module will also be configured to provide the transmission signals to the digital processing module.

Conforming to a prominent feature of MIMO radar systems, the transmission signals provided to the transmitting antenna elements are advantageously configured such that they are transmitted as orthogonal waveforms. Reflected transmission signals may then be assigned to their respective transmitting antenna element, and thereby provide the virtual augmentation of the receiver array.

The digital processing module collects and amplifies the reflected transmission signal received by the receiving antenna elements. The digital processing module is configured to collect the data from the receiving antennas via individual connections, and may provide an individual low-noise amplifier for each receiving antenna element. The digital processing module is configured to perform the processing of the received data, and to include information about the transmission signals generated by the signal forming module in this processing. In particular, this may comprise a mixing of the received transmission signals with one or more transmission signals generated by the signal forming module. This mixing results in a down-converted signal at a beat frequency. The digital processing module may then be configured to detect, from the beat frequency and a phase of the down-converted signal, a distance to the object that caused the reflection of the respective transmission signal, and a velocity of this object.

Methods for extracting a position and velocity of an object from a range-Doppler matrix are well-known in the state of the art. This information may e.g. be extracted by means of stacking down-converted signals obtained from a sequence of repetitions (train) of the transmission signal, and for several transmission signals. On such stacks, the processing may be performed by means of a fast Fourier transform, FFT, algorithm, adapted to forming a range-Doppler matrix from the down-converted signal. Such a range-Doppler matrix yields a particular correlation of the transmitted and received transmission signal, from which position and velocity of the object can be determined.

Optionally, the signal forming module is configured to generate at least one of the transmission signals such that a frequency of the at least one transmission signal varies in time. Methods for creating such chirp signals are well known in the state of the art, and they can equally be applied in the presented MIMO radar system.

Optionally, the signal forming module is configured to generate the transmission signals repeatedly, and to add, from one repetition to a next repetition, a fixed phase shift to an initial phase of each of the first transmission signals, such that a phase difference between the first transmission signals and the other transmission signals increases by the fixed phase shift from repetition to repetition.

This increasing phase shift from chirp to chirp creates a distinctive doubling pattern in the correlation of the transmitted and received transmission signals. The doubling arises from the cross-correlation of the reflected non-shifted transmission signals and the reflected shifted transmission signals with the originally transmitted transmission signals, with the effect relying on the repetition of the transmission signals. In embodiments of the proposed MIMO radar system, the fixed phase increment yields a doubling of correlation peaks in the range-Doppler matrix in the Doppler direction. This "virtual" doubling of the peaks in the correlation yields a more robust prediction of the position of the object. It may be used for limiting a required transmission power and thus reducing both crosstalk problems between transmitter and receiver antennas, but also for increasing robustness against high ground clutter in the received signal. The cost for this gain lies in larger range-Doppler matrices and in a higher complexity of the extraction process.

Alternatively, or in addition to the option mentioned before, the signal forming module is configured to add, from one repetition to a next repetition, a fixed frequency shift to a frequency of each of the first transmission signals, such that a frequency difference between the first transmission signals and the other transmission signals increases by the fixed frequency shift from repetition to repetition. Adding a frequency shift can also create the distinctive pattern in the correlation of the transmitted and received transmission signals.

Optionally, the signal forming module is configured to generate and provide, from one repetition to a next repetition, the second transmission signals in alternation with the third transmission signals. This application of time-division multiplexing is particularly beneficial for the presented MIMO radar system, as it provides orthogonal waveforms in combination with advantages based on triangulation considerations, while at the same time reducing transmission power, since effectively only one of the two patches is operational at any given time. Application of this time-division multiplexing procedure is also beneficial for suppressing side lobes of the radar beam created by the first and the second transmitter patches.

Optionally, the signal forming module is configured to generate either the first transmission signals or the second transmission signals such that they have, within one repetition, a fixed difference in frequency compared to the respective other transmission signals. An advantageous embodiment employs transmission signals of fixed duration and of a chirp-form spanning a fixed frequency range, wherein either the first or the second transmission signals are shifted by a fixed amount in frequency, compared with the transmission signals of the respective other two transmitter patches. This application and combination of an orthogonal frequency division multiplexing process with the respective other coded wave forms creates a further distinctive doubling pattern in the correlation of the transmitted and received transmission signals. The doubling here arises again from the cross-correlation of the reflected shifted and non-shifted transmission signals with the original shifted and non-shifted transmission signals. However, contrary to the doubling caused by the phase shift or the frequency shift from chirp to chirp as described above, the doubling of the pattern here does not rely on a repetition of the transmission signals. In embodiments of the proposed MIMO radar system, the fixed frequency shift also yields a doubling of correlation peaks in the range Doppler matrix, this time in the range direction. In this case, this "virtual" doubling of the peaks in the correlation yields a more robust prediction of the position of the object. As for the phase shift, this may be used for limiting a required transmission power and thus reducing both crosstalk problems between transmitter and receiver antennas, but also for increasing robustness against high ground clutter in the received signal. Again, the cost for this gain lies in larger range-Doppler matrices and in a higher complexity of the extraction process.

Optionally, some or all of the transmitting antenna elements are configured to transmit the transmission signals in a particular polarization, and some or all of the receiving antenna elements are configured to receive radar signals in the particular polarization. Such a polarization-division multiplexing is another way to render the transmission signals orthogonal. Embodiments may e.g. assign a particular polarization to a particular transmitter patch, i. e. all transmitting antenna elements of one transmitter patch may be configured for a different polarization than all transmitting antenna elements of another transmitter patch. However, it may also be that all transmitting antenna elements are configured to radiate in the same polarization. Co-polarizing the antenna elements is beneficial for achieving a suppression of ground clutter.

Optionally, the particular polarization is a horizontal linear polarization. Horizontal linear polarization is particularly beneficial for the application in urban environments, where it can be important for the MIMO radar system to detect horizontal structures, as wires and cables, in particular when spanned in a flight path of the aerial vehicle, as e.g. across a street.

Optionally, the transmitting antenna elements are each configured with an indentation (e.g. a slit, a slot, a cut, or a gap), adapted to determine a phase of the corresponding transmission signal. In addition, a waveform of the second transmission signals is equal to a waveform of the third transmission signals. Furthermore, the second transmitting antenna elements and the third transmitting antenna elements are configured to implement on the second transmission signals, relative to the third transmission signals, a phase shift of 180 degrees (or half a wave length). An effect of this phase selective, symmetric triggering is a focusing of a radar beam formed by the second transmission signals and the third transmission signals.

Optionally, the receiving antenna elements are each configured with an indentation (e.g. a slit, a slot, a cut, or a gap), adapted to implement a phase on the corresponding received transmission signal, and the receiving elements are positioned on nodes of a rectangular grid, and configured such that any two receiving elements positioned on adjacent nodes, both receiving a respective copy of a particular transmission signal, implement, on the two copies, a relative phase shift of 180 degrees.

Optionally, a first distance between the first transmitter patch and the second transmitter patch and a second distance between the second transmitter patch and the third transmitter patch are configured, with respect to an arrangement of the transmitting antenna elements, to suppress grating lobes in an intensity profile of the transmitted transmission signals. In a MIMO system, an intensity profile of a radar beam formed by the transmitted transmission signals depends mainly on the phases and relative amplitudes of the transmission signals. However, a regularity of the positions of the transmitting antennas can lead to undesirable local maxima in the intensity profile. These maxima are referred to as grating lobes. In the presented MIMO radar system, positions of transmitter antenna elements within each transmitter patch can be regular. The first and the second distance between the transmitter patches, which may be measured along the first and the second direction respectively, is constrained by the requirement of creating virtual receiving elements. However, this constraint generally leaves a range of choices for the first and the second distance. Different choices within this range give rise to different intensity profiles for the radar beam formed by the transmitted transmission signals. Intensity profiles can differ in particular with respect to grating lobes. A particular choice may be picked such that grating lobes are suppressed, i.e. peak values of the intensity profile besides the intended lobe or lobes are minimized.

Optionally, the MIMO radar system comprises one or more further transmitter patches with one or more further pluralities of transmitting antenna elements, configured to transmit, respectively, one or more further pluralities of transmission signals. These further transmitter patches may e.g. be beneficial for producing the radar beam from the combination of the transmission signals. They may also provide further virtual receiving antenna elements, i.e. enlarge the virtual array. The previously described ways of creating orthogonal transmission signals by frequency offsets or by phase shifts from chirp to chirp may be extended to the one or more further transmitter patches. The one or more further transmitter patches may also be employed to implement further orthogonality relations between the transmission signals.

The present invention also relates to a method for running a multiple-input multiple-output, MIMO, radar system for an aerial vehicle. The MIMO radar system comprises a first transmitter patch, a second transmitter patch, and a third transmitter patch, with these transmitter patches comprising, respectively, a first, second, and third plurality of transmitting antenna elements configured to transmit, respectively, a first, second and third plurality of transmission signals. The MIMO radar system further comprises a plurality of receiving antenna elements, wherein each receiving antenna element is configured to receive the transmitted transmission signals after their reflection from an object. For such a MIMO radar system, the method comprises the following steps:

generating the transmission signals repeatedly;
optionally, adding, from one repetition to a next repetition, to an initial phase of each of the first transmission signals a fixed phase shift, such that a phase difference between the first transmission signals and the other transmission signals increases by the fixed phase shift from repetition to repetition;
detecting, based on the received transmission signals, characteristics of the object.

This method may advantageously be implemented by means of a machine-executable program. Therefore, embodiments furthermore relate to a computer program product comprising stored software code, adapted to perform the steps of this method with a MIMO radar system of the proposed type, when executed on a data processing system.

In embodiments as described above, wherein the signal forming module is configured to generate the transmission signals repeatedly, and to add, from one repetition to a next repetition, a fixed frequency shift to a frequency of each of the first transmission signals, it is understood that this addition is not repeated for an indefinite number of times. Rather, it is understood that after a fixed number of repetitions, the frequency of the first transmission signals is reset to an initial value, from which the repeated addition of a frequency shift may begin anew. The fixed number of repeated transmission signals may be referred to as a "train". In embodiments, this may also be what is known as a burst. In some embodiments, after the fixed number of first transmission signals has been transmitted, the transmission of the first transmission signals may be temporarily paused.

In embodiments as described above, the expression that the signal forming module is configured to generate and provide, from one repetition to a next repetition, the second transmission signals in alternation with the third transmission signals is understood as defining an alternating sequence of second transmission signals and third transmission signals. That is, after the MIMO system has transmitted the second transmission signals, it transmits, in a temporally subsequent fashion, the third transmission signals. After having transmitted the third transmission signals, it transmits, in a temporally subsequent fashion, the second transmission signals, and so on.

In embodiments as described above, wherein the second transmitting antenna elements and the third transmitting antenna elements are configured to implement on the second transmission signals, relative to the third transmission signals, a phase shift of 180 degrees (or half a wave length), the effect of this phase selective, symmetric triggering is a focusing of a radar beam formed by the second transmission signals and the third transmission signals. This focusing effect relies on a constructive and destructive interference of the second and the third transmission signals.

In embodiments as described above, wherein the receiving elements are positioned on nodes of a rectangular grid and configured such that any two receiving elements positioned on adjacent nodes implement a relative phase shift of 180 degrees on a received transmission signal, it is understood that the notion of the two copies of that transmission signal in fact refer to that single transmission signal as detected by the two mentioned receiving elements.

An important aspect of the presented MIMO radar system is that it overcomes range limitations of prior art MIMO radar systems in ground vehicles (e.g. cars). While ground vehicle MIMO systems generally operate at ranges up to a few hundred meters, the presented MIMO radar system is capable of covering ranges of up to a few kilometers, while embodiments show that it can be realized in a limited space, comparable to that of a ground vehicle MIMO radar system. This property makes the presented MIMO radar system suited for aerial vehicles. Prior art MIMO radar systems for ground vehicles generally cannot be adapted to the high ranges required for aerial vehicles, as the energy required for the transmission signals is typically too high for the electronics of the ground vehicle MIMO radar systems.

BRIEF DESCRIPTION OF THE DRAWINGS

Various embodiments of the present invention will be described in the following by way of examples only, and with respect to the accompanying drawings, in which.

DETAILED DESCRIPTION OF THE DRAWINGS

Various examples will now be described more fully with reference to the accompanying drawings in which some examples are illustrated.

Accordingly, while examples are capable of various modifications and alternative forms, the illustrative examples in the figures will herein be described in detail. It should be understood, however, that there is no intent to limit examples to the particular forms disclosed, but on the contrary, examples are to cover all modifications, equivalents, and alternatives falling within the scope of the disclosure. Like reference numbers refer to like or similar elements throughout the description of the figures.

The terminology used herein is for the purpose of describing illustrative examples only and is not intended to be limiting. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements and/or components, but do not preclude the presence or addition of one or more other features, steps, operations, elements, components and/or groups thereof.

Unless otherwise defined, all terms (including technical and scientific terms) used herein have the same meaning as commonly understood by one of ordinary skill in the art to which examples belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
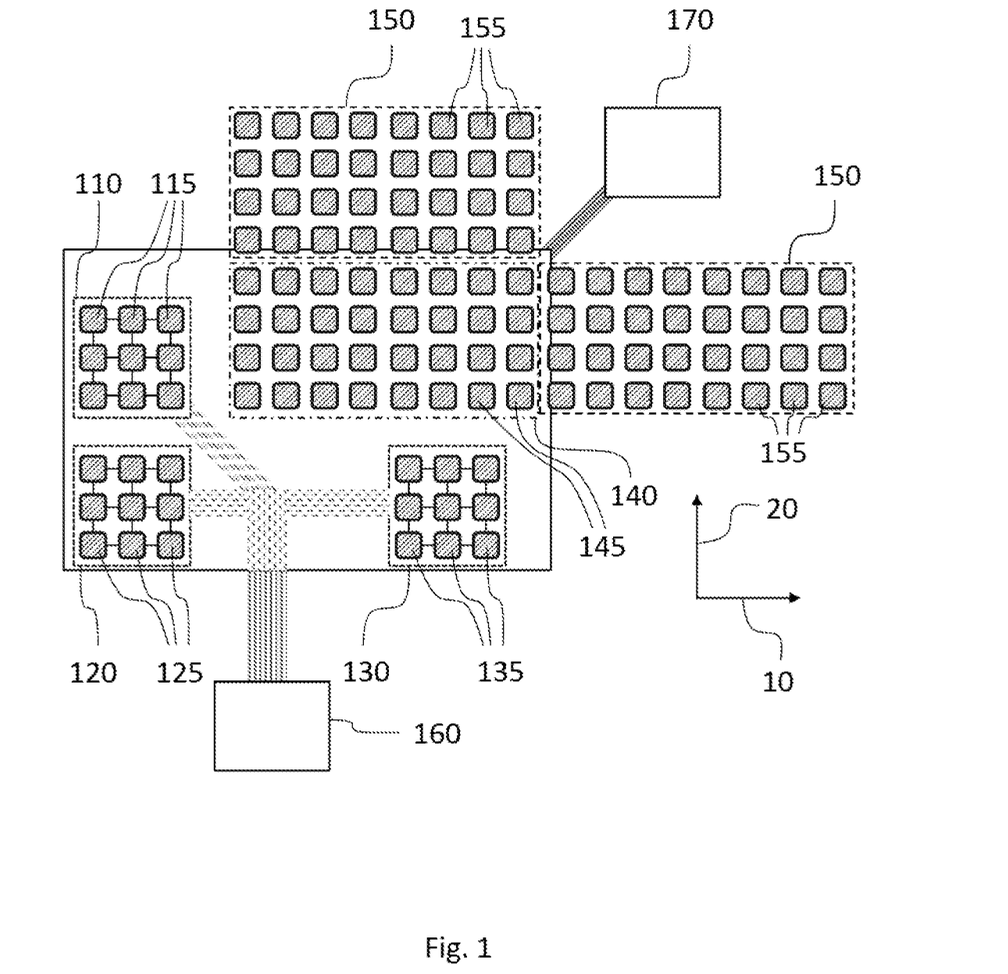
FIG. 1 shows an antenna array for a MIMO radar system according to an embodiment of the present invention.

FIG. 1 shows arrangement of antenna elements 115, 125, 135, 145 for a multiple-input multiple-output, MIMO, frequency-modulated continuous wave, FMCW, radar system which is adapted for detecting an object in a vicinity of an aerial vehicle. Depicted is a first transmitter patch 110, a second transmitter patch 120, and a third transmitter patch 130, comprising, respectively, a first, second, and third plurality of transmitting antenna elements 115, 125, 135. The transmitter antenna elements 115, 125, 135 are configured to transmit, respectively, a first, second and third plurality of transmission signals 210, 220, 230. Depicted is further a plurality of receiving antenna elements 145. Each receiving antenna element 145 is configured to receive electromagnetic waves in a frequency range of the MIMO radar system, including in particular the transmitted transmission signals 210, 220, 230 after their reflection from the object.

A first direction 10 between the first transmitter patch 110 and the second transmitter patch 120 is different from a second direction 20 between the second transmitter patch 120 and the third transmitter patch 130. In the embodiment presented in this figure, the first direction 10 corresponds to an azimuthal angle, while the second direction 20 corresponds to an elevation angle. However, the two directions 10, 20 do not need to be orthogonal. Each transmitter patch 110, 120, 130 includes multiple transmitting antenna elements 115, 125, 135, in the first as well as in the second direction 10, 20. With this arrangement, a virtual array of receiving antenna elements 155 is achieved, which extends the plurality of receiving antenna elements 145 in the first direction 10 and in the second direction 20 in a gap-free and homogeneous way.

In the present embodiment, there are nine first, second and third transmitting antenna elements 115, 125, 135 in the first, second and third transmitter patch 110, 120, 130, respectively. Each transmitting antenna element 115, 125, 135 is a quadratic patch antenna. In other embodiments, other numbers and forms of antennas can be more advantageous. In the present embodiment, the transmitting antenna elements 115, 125, 135 are arranged within each transmitter patch 110, 120, 130 on nodes of a 3×3 square lattice. Distances between the closest transmitting antenna elements 115, 125, 135 are on the order of one half of a side length of the transmitting antenna elements 115, 125, 135.

In the present embodiment, there is one receiver patch 140 comprising 32 receiving antenna elements 145, arranged on nodes of a 4×8 square lattice. The receiving antenna elements 145 are of the same form as the transmitting antenna elements 115, 125, 135, and distances between them are the same as distances between transmitting antenna elements 115, 125, 135 within their respective transmitter patch 110, 120, 130. The receiving antenna elements 145 are supported by virtual receiving antenna elements 155, forming a gap-free and homogeneous extension of the actual receiving antenna elements 145. Here, gap-free and homogeneous means a seamless, smooth extension of the receiver patch 140 comprising the actual receiving antenna elements 145.

The MIMO radar system also comprises a signal forming module 160, which is configured to generate the transmission signals 210, 220, 230 and to provide the transmission signals 210, 220, 230 to the respective transmitting antenna elements 115, 125, 135. The transmission signals 210, 220, 230 are provided individually to the transmitting antenna elements 115, 125, 135 for beamforming, so that each transmitter patch 110, 120, 130 can be used for sending an individual radar beam within a range of the azimuthal angle (corresponding to the first direction 10) and within a range of the elevation angle (corresponding to the second direction 20), depending on a choice of phases for the transmission signals 210, 220, 230.

The MIMO radar system further comprises a digital processing module 170, configured to detect, based on the received transmission signals 215, 225, 235, characteristics of the object. In the present embodiment, the digital processing module 170 is configured to amplify received signals (i.e., received electromagnetic radiation) from each actual receiving antenna element 145 by an individual low-noise amplifier. The received signals are processed by a digital processor, which is configured to perform a digital data analysis of the received signals. The digital processing module 170 is configured to perform windowing and plot extraction on the received signals; this can also include further standard radar signal processing steps. The digital processing module 170 is also configured to generate a range-Doppler matrix 300, and to extract, based on the range-Doppler matrix, a position (or range) and a velocity (or speed) of the object, which are determined from a correlation of the transmitted transmission signals 210, 220, 230 and the received transmission signals 215, 225, 235 contained in the received electromagnetic radiation.

Figure 2:
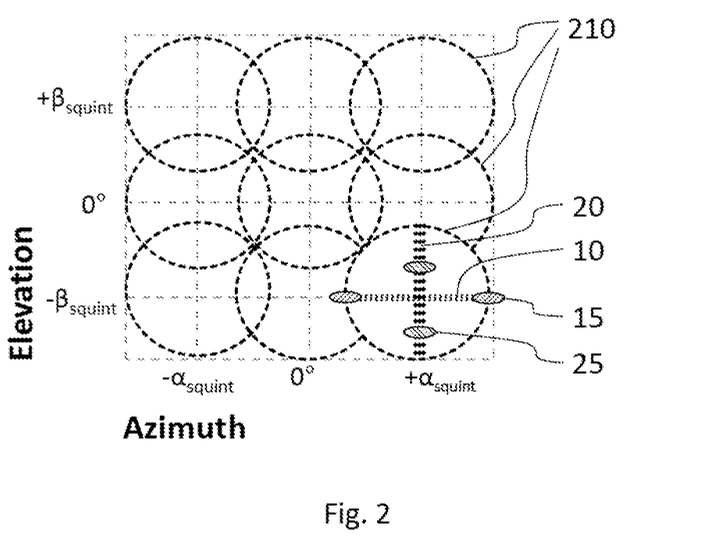
FIG. 2 shows a transmission scan line in the field of view of a transmitter patch of the MIMO radar system.

FIG. 2 shows a transmission scan line of a field of view of one of the transmitter patches 110 of the proposed MIMO radar system. The exemplary nine transmitting antenna elements 115, arranged in a square grid of 3×3 positions, each transmit a particular transmission signal 210. Collectively, the transmitted transmission signals 210 form a radar beam. Due to the fixed arrangement of the transmission antenna elements 115, centers of the transmitted transmission signals 210 differ from each other. The centers of the transmitted transmission signals 210 form a corresponding grid, located within a range given by an angle $\alpha_{squint}$ from the normal direction of the planar transmitter patch 110 in the azimuthal direction 10, and a range given by an angle $\beta_{squint}$ from the normal direction of the planar transmitter patch 110 in the elevation direction 20. Within the field of view of the transmitter patch 110, given by a solid angle defined by the angles $\alpha_{squint}$ and $\beta_{squint}$, the signal forming module 160 is configured to control a phase and a relative amplitude of each transmission signal 210. By this, a pattern of constructive and destructive interference between the transmitted transmission signals 210 is generated, which determines a more precise direction and a form of the radar beam. In this way, multiple independent beams (or lobes, i.e. peaks in an intensity profile), pointed in several directions at the same time, can be formed by the signal forming module 160. This beam steering process is performed in analog components of the signal forming module 160. In particular, beam steering can be performed such that the beam is directed/formed in the azimuthal angle 10 and/or in the elevation angle 20.

The signal processing module can, even if it is adapted to produce a continuous wave radar beam, also be configured to generate a short pulse, or monopulse, in any direction within the field of view. In particular, such a monopulse can be directed in a given azimuthal angle 15, or in a particular elevation angle 25.

Digital beamforming can be implemented for the digital processing module 170. Here, by adapting phases and relative amplitudes of received signals, an increased collective sensitivity of the receiving antenna elements 145 (not depicted in this figure) in a particular direction can be achieved.

Figure 3:
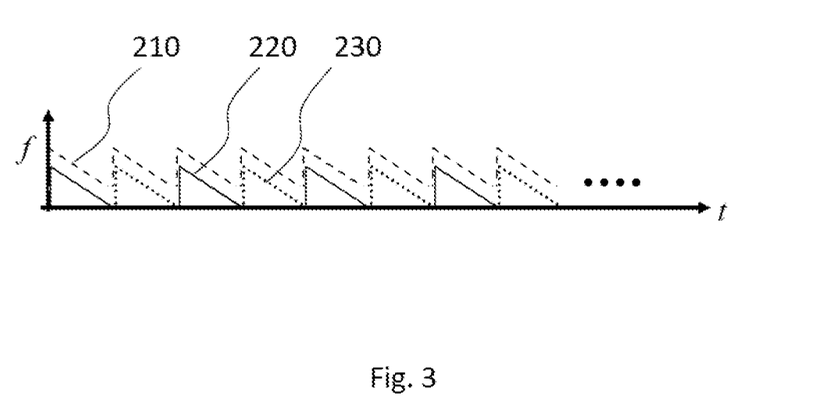
FIG. 3 shows a frequency as a function of time of first, second and third transmission signals.

FIG. 3 shows a plot of frequency f as a function of time t for a repeated first, a repeated second and a repeated third transmission signal 210, 220, 230. Each transmission signal 210, 220, 230 in this embodiment is of a down-chirp form, its frequency decreasing linearly with time, any other chirp form e.g. up-chirp or up-and-down-chirp or frequency-hopping chirp are possible. The second transmission signal 220 and the third transmission signal 230 have the same waveform (i.e., they show the same frequency profile), and they are generated by the signal forming module 160 in alternation (time-division multiplexing). The first transmission signal 210 is of the same duration as the other two transmission signals 220, 230, and also decreases by the same amount in frequency, but starts from a higher frequency than the other two transmission signals 220, 230. The first transmission signal 210 is therefore offset by a fixed frequency shift from the second and the third transmission signal 220, 230.

Advantages of this configuration of the transmission signals 210, 220, 230 include a reduction of the transmission power, which is achieved by splitting the transmission energy on the second and the third transmitter patch 120, 130. Furthermore, the time-division multiplexing allows an identification of the respective transmitter patch 120, 130 from which a received transmission signal 225, 235 originated. This, in turn, provides additional information on a propagation path of the transmission signal 220, 230.

Furthermore, the signal forming module 160 may be configured to add, in the first transmission signal 210 and from one repetition to the next repetition (i.e. from chirp to chirp), a fixed shift in a phase, or a fixed shift in frequency. Each of these shifts yields a respective doubling of a peak of correlation in a range-Doppler matrix determined by the digital processing module 170. The shift in phase from chirp to chirp yields a doubling of correlation peaks in a Doppler direction of the range-Doppler matrix (see FIG. 5). The shift in frequency yields a doubling of correlation peaks in a range direction of the range-Doppler matrix.

Figure 4:
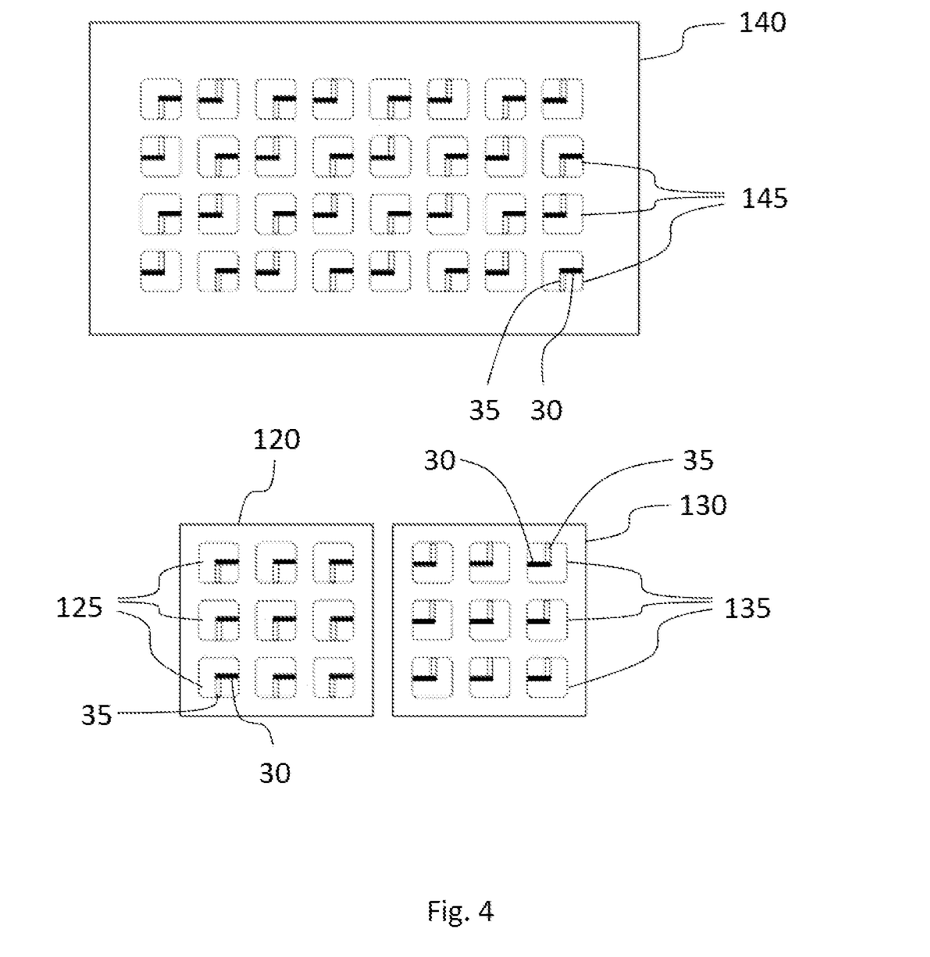
FIG. 4 shows a structure of receiving and transmitting antenna elements.

FIG. 4 shows a structure of antenna elements 125, 135, 145. In the upper part of the figure, the receiving antenna elements 145 are displayed. Each receiving antenna element 145 is configured with an indentation 30 or cut, which has the effect that the receiving antenna element 145 receives a correspondingly, in the present embodiment horizontally polarized signal. The direction of the indentation 30 has an effect on a phase of the received signal. The receiving antenna elements 145 are arranged such that every pair of next neighbors implements a phase shift or difference of 180° (or, equivalently, a shift by half a wavelength) between the corresponding two copies of the same received signal. The indentations 30 are adapted for a horizontal, the indentations 35 for a vertical linear polarization. The receiving antenna elements 145 may be rotatable, and the digital processing module 170 may be configured to rotate the receiving antenna elements 145.

A lower part of the figure shows two horizontally arranged transmitter patches 120, 130. Each of the transmitting antenna elements 125, 135 also shows an indentation 30, determining a horizontal polarization for the emitted transmission signals 220, 230. Here, the respective transmitting antenna elements 125, 135 of each transmitter patch 120, 130 are arranged such that one transmitter patch implements on its transmission signals a relative phase shift of 180 degrees with respect to the transmission signals emitted from the other transmitter patch. The indentations 30 are again adapted for a horizontal, the indentations 35 for a vertical linear polarization. The transmitting antenna elements 125, 135 may be rotatable, and the signal forming module 160 may be configured to rotate the individual transmitting antenna elements 125, 135.

The phase shift by 180 degrees between the two transmitter patches 120, 130 has the effect of focusing the radar beam formed by the transmission signals. Analogously, directions in which the receiving antenna elements 145 are more focused due to the relative phase displacement of any two neighboring receiving antenna elements 145. This reduces side lobes in the radar beam, increases a quality of focusing the receiving antenna elements 145 into a direction from which the transmitted transmission signals 210, 22, 230 are to be expected (beamforming of the received signal). In turn, a configuration as displayed here allows a further decrease in signal transmission power, and thus contributes to avoiding crosstalk or overcharging problems.

Figure 5:
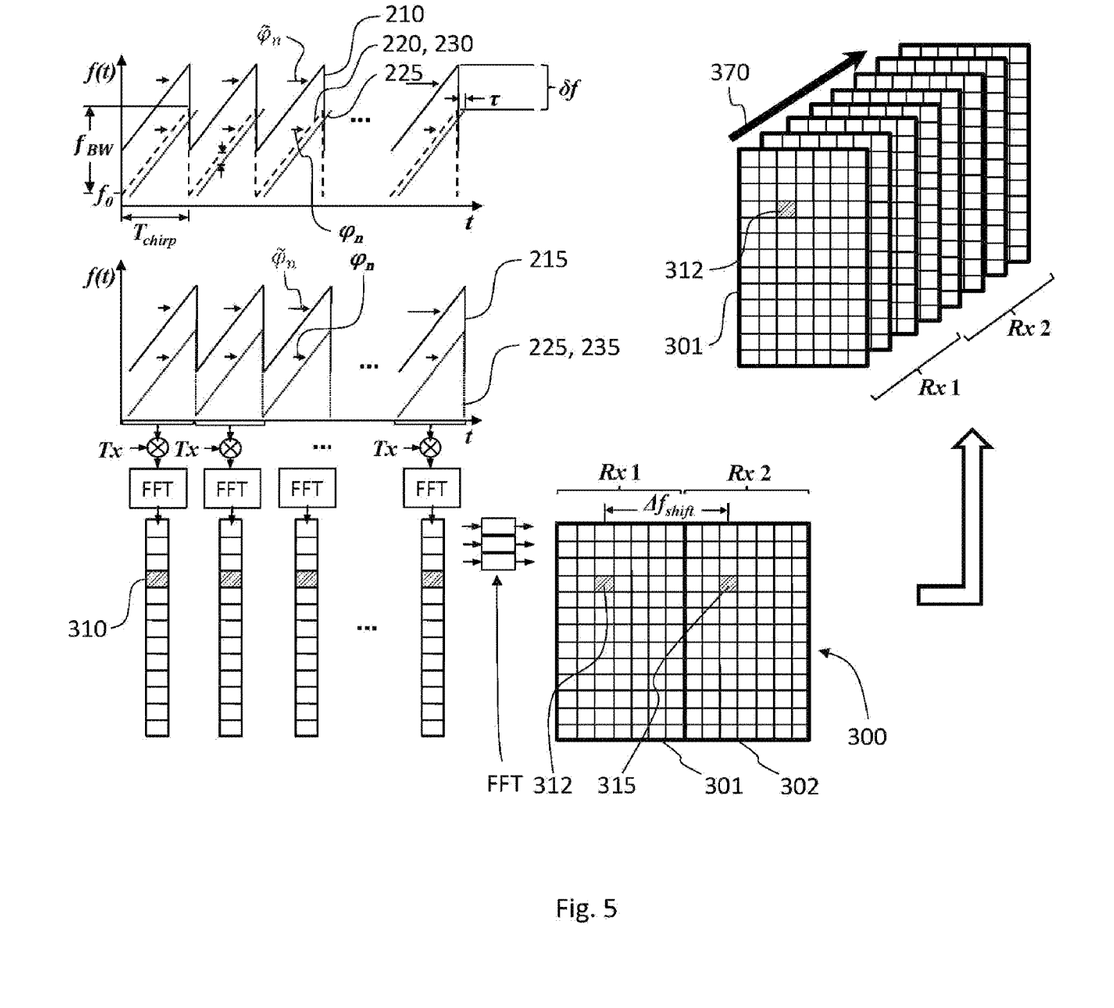
FIG. 5 illustrates first transmission signals with a frequency offset over the second and third transmission signals, and a phase shift from one repetition to a next, and a digital processing of received transmission signals.

FIG. 5 illustrates, on the upper left side, a plot of frequency f over time t for a train (fixed number of repetitions) of emitted first transmission signals 210 with a frequency offset δf over analogous trains of emitted second (and third) transmission signals 220, 230. In this embodiment, all transmission signals 210, 220, 230 are up-chirp signals of duration $T_{chirp}$, with a linear rise in frequency across a frequency difference $f_{BW}$. The first transmission signal 210 in addition undergoes a fixed phase shift from one chirp to the next. This means that a phase $\tilde{\varphi}_n$ of the nth first transmission signal 210 deviates from a phase $\varphi_n$ of the nth second (or third) transmission signal 220, 230 by an amount $$\tilde{\varphi}_n = \varphi_n + n \times 2\pi \Delta f_{shift} T_{chirp}, \quad (1)$$

with a fixed constant $\Delta f_{shift}$ having the dimension of a frequency, and n ranging from 1 to a total number N of chirps in the train. Also represented in this plot is a profile of a received transmission signal 225, deriving from the transmitted (or emitted) second transmission signals 220 by reflection from an object. Compared with the second (or third) emitted transmission signal 220, 230, the received transmission signal 225 is shifted in time by a duration τ, due to the runtime of the second transmission signal 220 from the second transmitter patch 120 to the object and back to the receiver patch 140. The received transmission signal 225 further differs from the second (or third) transmission signal 220, 230 by a (small, and therefore here not displayed) amount in frequency, due to a relative speed of the object with respect to the MIMO radar system.

In the middle of the left-hand side of the figure, there is a plot of frequency over time for the received transmission signals 215, 225, 235, derived, respectively, from the emitted transmission signals 210, 220, 230 by reflection from the object. The relative frequency shift between the first received transmission signal 215 and the two other received transmission signals 225, 235 is the same as the relative shift in frequency between the first emitted transmission signal 210 and the other two emitted transmission signals 220, 230. Also, the fixed phase shift added from chirp to chirp in the first transmission signal 210 leads to an analogous shift and phase difference between the received first transmission signal 215 and the received second and third transmission signals 225, 235.

The digital processing module 170 is configured to convert the received transmission signals 215, 225, 235 down, e.g. by mixing them with the original transmission signals 210, 220, 230, provided by the signal forming module 160. This conversion is depicted below the plot of the received transmission signals 215, 225, 235.

The down-converted signals can then be processed digitally in electronic components of the digital processing module 170. In the present embodiment, the digital processing module 170 is configured to subject the down-converted signal, for each repetition of the received transmission signals 215, 225, 235, to a discrete Fourier transform (e.g. by a Fast Fourier Transform, FFT, algorithm). This can be used to generate a range vector for each transmission period of duration $T_{chirp}$. These range vectors are represented by the columns on the lower left of the figure. Individual boxes of these columns correspond to range bins, i.e. to intervals of radial distance from the MIMO radar system. Entries of the range vectors are related to a correlation of transmitted and received transmission signals 210, 220, 230, 215, 225, 235, or, respectively, are obtained by a dechirping by means of the FFT. Within each range vectors, the object (or target) causing the reflection of the transmission signals 210, 220, 230 yields a high correlation 310 of transmitted and received transmission signals 210, 220, 230, 215, 225, 235 within a certain range bin, which indicates its presence in the corresponding distance from the MIMO radar system.

The range vectors are then stacked together as columns of a matrix, and the digital processing module 170 is configured to perform a second discrete Fourier transform (FFT), this time taking the data from the rows of this matrix, characterized by a fixed range bin. This produces a range-Doppler matrix 300, depicted on the lower right of the figure. The entries of the range-Doppler matrix 300 are directly related to a correlation of the emitted transmission signals 210, 220, 230 and the received signals. Each position in the range-Doppler matrix 300 determines a range bin through its row, and a velocity bin through its column. Entries indicating a high correlation signal a presence of an object with a respective relative range and velocity.

Due to the increase in phase difference according to equation (1), the range-Doppler matrix 300 displays not one, but two (or, in the case of further transmitter patches respectively further orthogonal signals, more than two) columns with a high correlation, indicating a velocity of the same object twice (or more). The two sectors 301, 302 of the range-Doppler matrix 300 arise from the two different kinds of received signals: those with an additional shift in phase from chirp to chirp, and those without. The difference between the two positions of high correlation 312, 315 within a row of the range-Doppler matrix is determined by $\Delta f_{shift}$ from equation (1), i.e. by the fixed increase in phase difference $\tilde{\varphi}_n - \varphi_n$, and by the duration $T_{chirp}$ of the transmission signals. This doubling of correlation peaks has the advantage that noise contamination can be eliminated more reliably. In turn, this means that transmission power can be reduced, suppressing crosstalk problems between transmitter and receiver antennas, high ground clutter in the received signal, and generally an overcharge of the receiver.

The fixed frequency shift, or frequency offset, δf leads to a further doubling of correlation maxima in the range-Doppler matrix. This is so because the first transmission signals 210 are correlated with the second and third transmission signals 220, 230, and any received transmission signal 215, 225, 235 will therefore be correlated with both a first transmission signal 210 as well as with a second (or third) transmission signal 220, 230. This doubling of correlation peaks occurs within each of the range vectors (the columns depicted on the lower left side of the figures). However, this effect has been omitted in the figure for clarity.

The upper right part of the figure illustrates that the digital processing module 170 can be configured to employ individual sectors 301, 302 of a plurality of range-Doppler matrices 300 for a digital beamforming process, thereby increasing sensitivity in particular directions and ranges of interest (e.g. due to a presence of a detected object). This further increases an accuracy of the detection, and can serve to reduce transmission power.

Figure 6:
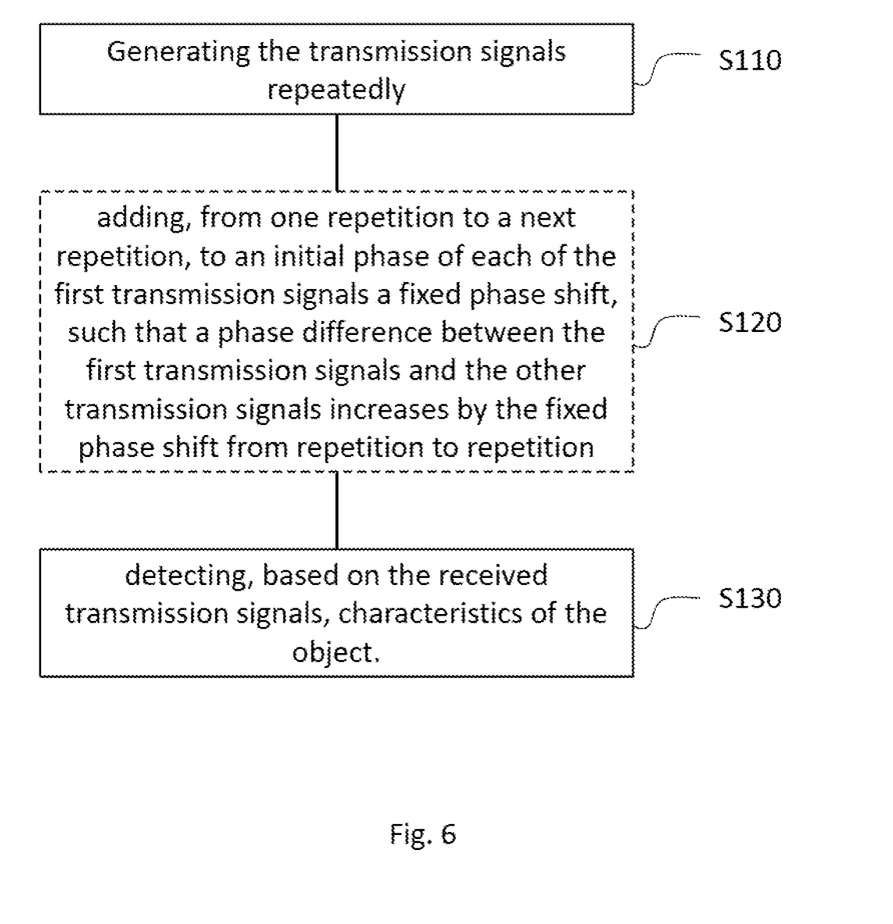
FIG. 6 shows steps of a method for running a multiple-input multiple-output, MIMO, radar system for an aerial vehicle.

FIG. 6 shows steps of a method for running a multiple-input multiple-output, MIMO, radar system for an aerial vehicle. The MIMO radar system may be configured to generate a continuous wave radar signal (FMCW). The MIMO radar system comprises a first transmitter patch 110, a second transmitter patch 120, and a third transmitter patch 130. The transmitter patches 110, 120, 130 comprise, respectively, a first, second, and third plurality of transmitting antenna elements 115, 125, 135, configured to transmit, respectively, a first, second and third plurality of transmission signals 210, 220, 230. The MIMO radar system further comprises a plurality of receiving antenna elements 145, wherein each receiving antenna element 145 is configured to receive the transmitted transmission signals 210, 220, 230 after their reflection from an object. The method comprises a step of generating (S110) the transmission signals 210, 220, 230 repeatedly. The transmission signals 210, 220, 230 may in particular have a chirp form. They may be emitted in trains, i.e. with a fixed number of signals directly after another, followed by a pause. Optionally, a second step may be performed in the proposed method, which comprises adding (S120), from one repetition to a next repetition, to an initial phase of each of the first transmission signals 210 a fixed phase shift, such that a phase difference between the first transmission signals 210 and the other transmission signals 220, 230 increases by the fixed phase shift from repetition to repetition. In any case, a further step of the method then comprises detecting 130, based on the received transmission signals 215, 225, 235, characteristics of the object.

The description and drawings merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e. a particular feature described in one embodiment may also be realized in other embodiments. Such combinations are covered by the disclosure herein, unless it is stated that a specific combination is not intended.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the wavelength ranges of the sensors, functioning or arrangement of individual elements stated in an exemplary embodiment without leaving the scope of the invention, which is defined by the claims and their legal equivalents, such as further explanations in the description.

LIST OF REFERENCE SIGNS 10 first direction
15 azimuthal angle of monopulse
20 second direction
25 elevation angle of monopulse
30, 35 indentations
110 first transmitter patch
115 first transmitting antenna elements
120 second transmitter patch
125 second transmitting antenna elements
130 third transmitter patch
135 third transmitting antenna elements
140 receiver patch
145 receiving antenna elements
150 virtual array of receiving antenna elements
155 virtual receiving antenna elements
160 signal forming module
170 digital processing module
210 first transmission signals
215 received first transmission signals
220 second transmission signals
215 received second transmission signals
230 third transmission signals
235 received third transmission signals
300 range-Doppler matrix
301, 302 sections of range-Doppler matrix
310 correlation peak, indicating range of object
312 first correlation peak, indicating range and velocity of object
315 second correlation peak, indicating range and velocity of object
370 digital beamforming based on received transmission signals
S110, S120, S130 steps of a method

The invention claimed is:

1. A multiple-input multiple-output (MIMO) radar system for detecting an object in a vicinity of an aerial vehicle, the MIMO radar system comprising:
a first transmitter patch, a second transmitter patch, and a third transmitter patch, comprising, respectively, a first, second, and third plurality of transmitting antenna elements configured to transmit, respectively, a first, second and third plurality of transmission signals;
a plurality of receiving antenna elements, wherein each receiving antenna element is configured to receive the transmitted transmission signals after their reflection from the object;
a signal forming module configured to generate the transmission signals and to provide the transmission signals to their respective transmitting antenna elements; and
a digital processing module configured to detect, based on the received transmission signals, characteristics of the object;
wherein a first direction between the first transmitter patch and the second transmitter patch is different from a second direction between the second transmitter patch and the third transmitter patch, and
wherein each transmitter patch includes multiple transmitting antenna elements in the first as well as in the second direction, thereby achieving a virtual array of receiving antenna elements which extends the plurality of receiving antenna elements in the first and in the second direction in a gap-free and homogeneous manner.

2. The MIMO radar system of claim 1, wherein the signal forming module is configured to generate at least one of the transmission signals such that a frequency of the at least one of the transmission signals varies in time.

3. The MIMO radar system of claim 1, wherein the signal forming module is configured to generate the transmission signals repeatedly, and to add, from one repetition to a next repetition, one or both of:
   (i) to an initial phase of each of the first transmission signals, a fixed phase shift, such that a phase difference between the first transmission signals and the other transmission signals increases by the fixed phase shift from repetition to repetition,
   (ii) to a frequency of each of the first transmission signals, a fixed frequency shift, such that a frequency difference between the first transmission signals and the other transmission signals increases by the fixed frequency shift from repetition to repetition.

4. The MIMO radar system of claim 1, wherein the signal forming module is configured to generate the transmission signals repeatedly and to provide, from one repetition to a next repetition, the second transmission signals in alternation with the third transmission signals.

5. The MIMO radar system of claim 1, wherein the signal forming module is configured to generate either the first transmission signals or the second transmission signals so as to have a fixed difference in frequency compared to respective other transmission signals transmitted at the same time.

6. The MIMO radar system of claim 1, wherein
   some or all of the transmitting antenna elements are configured to transmit the transmission signals in a particular polarization, and
   some or all of the receiving antenna elements are configured to receive radar signals in the particular polarization.

7. The MIMO radar system of claim 6, wherein the particular polarization is a horizontal linear polarization.

8. The MIMO radar system of claim 6, wherein the transmitting antenna elements are each formed with an indentation, adapted to adapt a phase of the corresponding transmission signal.

9. The MIMO radar system of claim 8, wherein
   a waveform of the second transmission signals is equal to a waveform of the third transmission signals, and the second transmitting antenna elements and the third transmitting antenna elements are configured to implement on the second transmission signals, relative to the third transmission signals, a phase shift of 180 degrees, thereby focusing a radar beam formed by the second transmission signals and the third transmission signals.

10. The MIMO radar system of claim 6, wherein
    the receiving antenna elements are each formed with an indentation which is configured to adapt a phase of the corresponding received transmission signal, and
    the receiving elements are positioned on nodes of a rectangular grid, and configured such that any two receiving elements positioned on adjacent nodes, upon receiving a respective copy of a particular transmission signal, implement, on the two copies, a relative phase shift of 180 degrees.

11. The MIMO radar system of claim 1, wherein a first distance between the first transmitter patch and the second transmitter patch and a second distance between the second transmitter patch and the third transmitter patch are configured, with respect to an arrangement of the transmitting antenna elements, to suppress grating lobes in an intensity profile of the transmitted transmission signals.

12. The MIMO radar system of claim 1, further comprising:
    one or more further transmitter patches with one or more further pluralities of transmitting antenna elements, configured to transmit, respectively, one or more further pluralities of transmission signals.

13. A method for detecting an object in a vicinity of an aerial vehicle using a multiple-input multiple-output (MIMO) radar system according to claim 1, the method comprising the steps of:
    generating the transmission signals repeatedly; and
    detecting, based on the received transmission signals, characteristics of the object.

14. A computer product comprising a non-transitory computer readable medium having stored thereon program code which, when executed by one or more processors, controls a multiple-input multiple-output (MIMO) radar system according to claim 1 in order to:
    generate the transmission signals repeatedly; and
    detect, based on the received transmission signals, characteristics of the object.

* * * * *